United States Patent [19]
Jellis, Jr.

[11] 3,873,032
[45] Mar. 25, 1975

[54] MATERIAL FEEDING APPARATUS
[76] Inventor: James C. Jellis, Jr., P.O. Box 585, Watertown, S. Dak. 57201
[22] Filed: Nov. 12, 1973
[21] Appl. No.: 414,984

[52] U.S. Cl. ............... 239/658, 198/64, 214/519, 239/664, 239/667, 239/671, 239/673, 239/675, 239/676
[51] Int. Cl. .................. A01f 17/00, A01c 17/00
[58] Field of Search .......... 239/651, 658, 664, 667, 239/671, 675, 680, 687, 673, 659, 672, 676, 678, 682, 679, 670; 214/519–522; 222/178, 199, 318, 200, 415; 198/64, 213

[56] References Cited
UNITED STATES PATENTS

| | | | |
|---|---|---|---|
| 1,668,516 | 5/1928 | Litchfield et al. | 239/664 |
| 2,487,693 | 11/1949 | Canon | 198/65 |
| 3,109,560 | 11/1963 | Rosenleaf | 222/415 X |
| 3,164,276 | 1/1965 | Bastian | 214/519 |
| 3,175,830 | 3/1965 | Lepp | 239/679 |
| 3,189,204 | 6/1965 | Wiberg | 214/519 |
| 3,401,890 | 9/1968 | Middlesworth | 239/673 X |
| 3,583,646 | 6/1971 | Bogenschutz | 239/687 X |
| 3,648,935 | 3/1972 | Waldrum | 239/685 X |
| 3,794,198 | 2/1974 | Buchele et al. | 198/213 X |
| 3,796,354 | 3/1974 | Steinke | 239/675 X |
| R13,369 | 2/1912 | Funk | 239/667 |

FOREIGN PATENTS OR APPLICATIONS

| | | | |
|---|---|---|---|
| 197,106 | 4/1958 | Austria | 239/673 |
| 1,219,388 | 6/1966 | Germany | 214/519 |
| 530,326 | 7/1931 | Germany | 239/687 |
| 20,773 | 12/1889 | United Kingdom | 239/687 |

Primary Examiner—M. Henson Wood, Jr.
Assistant Examiner—Andres Kashnikow

[57] ABSTRACT

A self-unloading wagon operable to move particulate material, as hay, to a desired location, as a baler, grinder, chopper, feed bunk, windrow and the like. The apparatus has an open top box for receiving hay. A pair of vertically aligned hay separating drums are positioned at the rear portion of the box. A conveyor on the floor of the box moves the hay into the drums. A plurality of longitudinal walker bars located above the upper drum walk the hay in the upper part of the box in a forward direction. The upper drum has alternately directed left and right transverse teeth. The lower drum has outwardly directed fork members which carry the hay onto a transverse out conveyor. The out conveyor discharges the hay laterally of the box into the feeding mechanism of a baler or feed grinder. The out conveyor can be replaced with a spreader unit operable to spread particulate material behind the apparatus.

31 Claims, 13 Drawing Figures

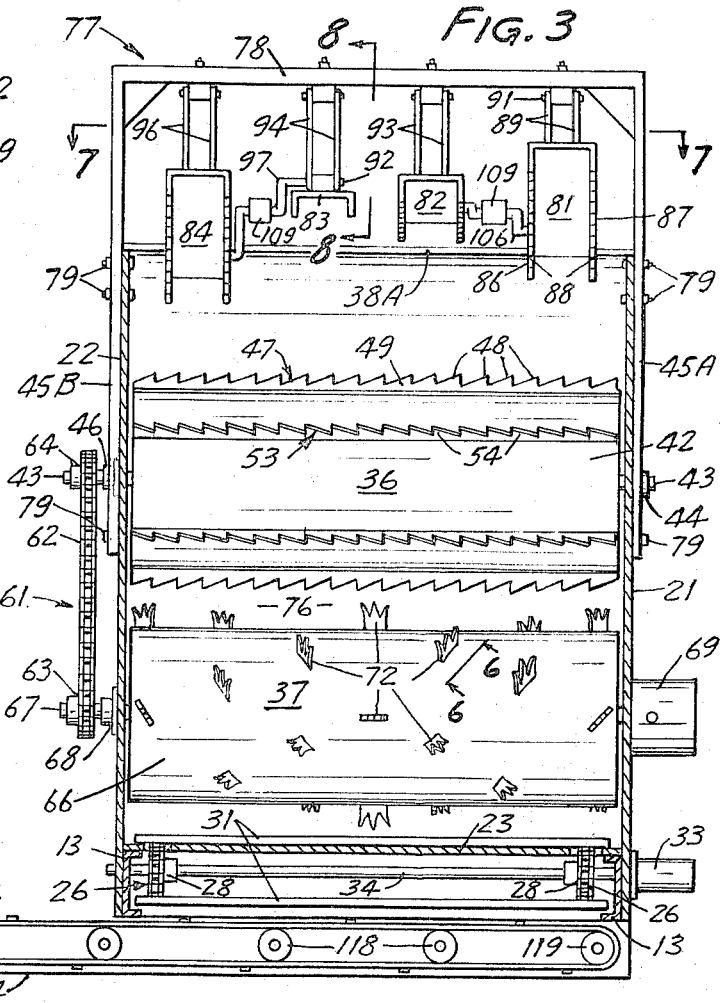
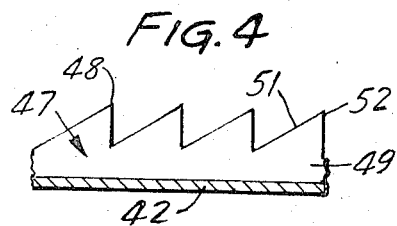
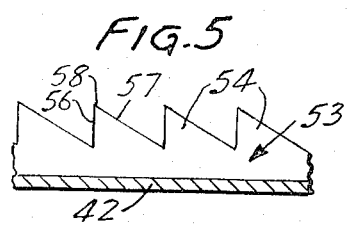
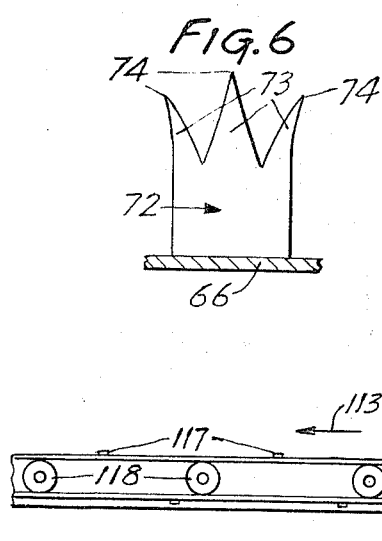
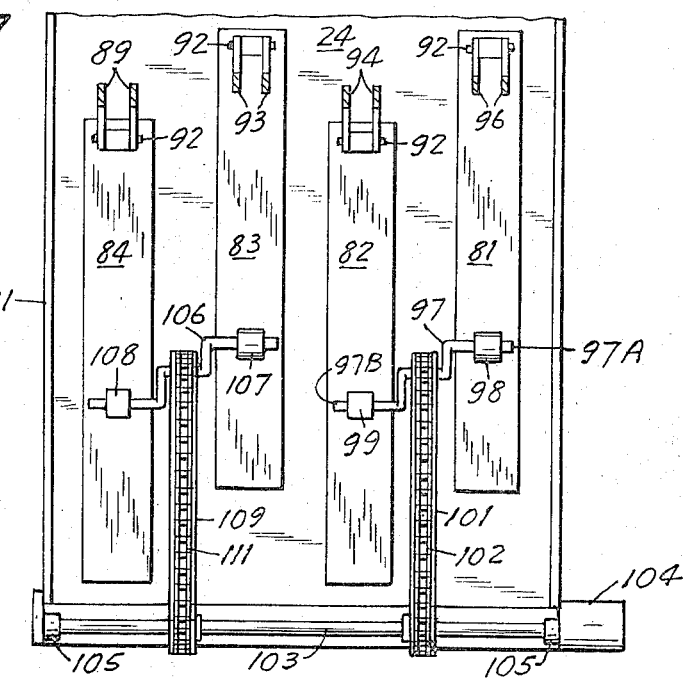

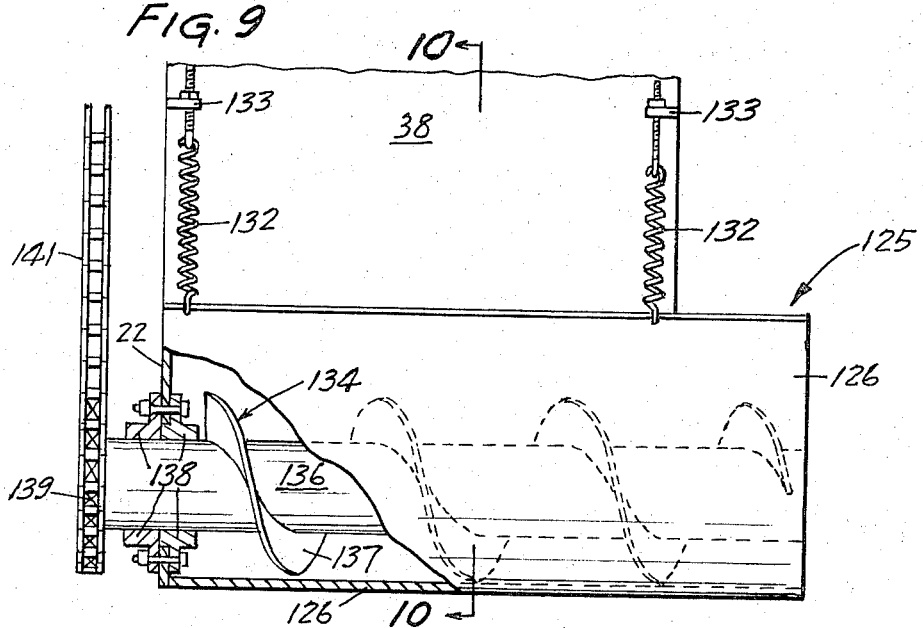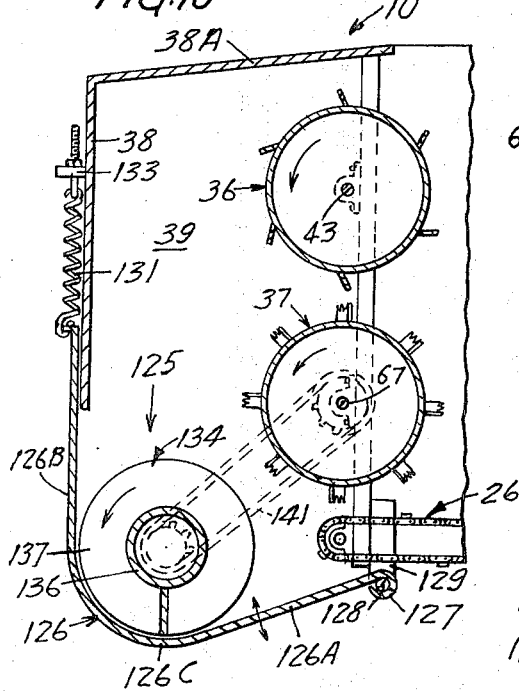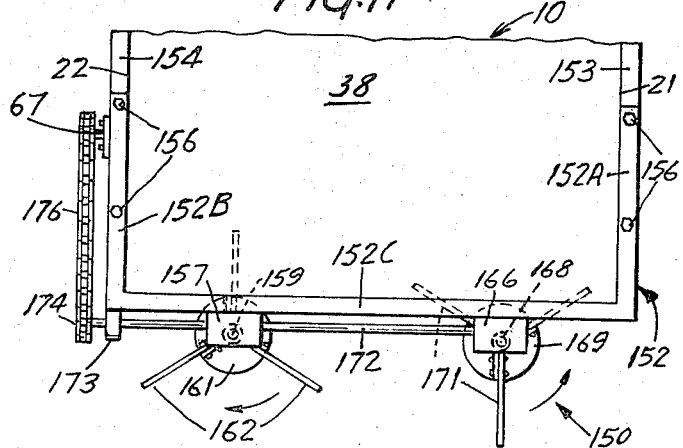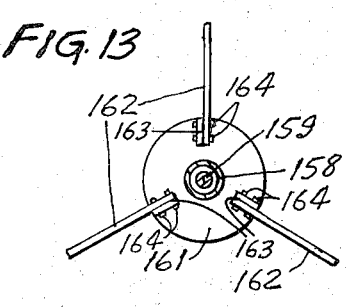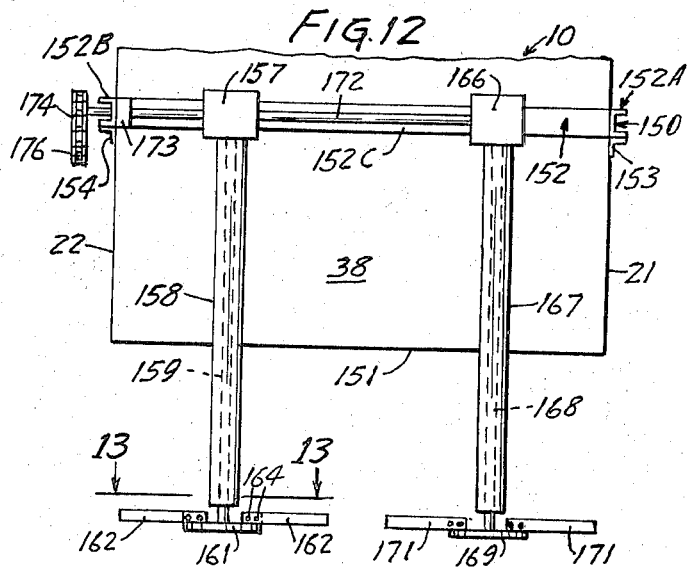

3,873,032

MATERIAL FEEDING APPARATUS

BACKGROUND OF THE INVENTION

It is common practice in grassland agriculture to cut and store grasses commonly known as hay in stacks located in the field. Machines have been developed to collect and stack the hay. These machines transport the hay to a location where it is automatically unloaded to form a stack. In the fall and winter months, the stacked hay is baled or ground and shipped to a feeding location. The hay from the stack must be fed in an even stream to the pickup apparatus of a baler or feed grinder to have efficient operation of the baler or feed grinder. The stacked hay must be hand fed into the baler or feed grinder. This requires considerable labor and time.

SUMMARY OF THE INVENTION

The invention is directed to a material handling apparatus which can receive particulate materials, as hay, from a stack, and deliver the hay in a uniform and even stream to the pickup portion of a hay baler or feed grinder. The hay is fed into the baler or feed grinder without hand labor thereby saving considerable time and labor. The steady and uniform feed of hay into the baler results in uniform packed bales. The material feeding apparatus has an open top box having a receiving chamber for the hay from the stack. Separator drums mounted on the rear portion of the box break up the hay and deliver the hay to a discharge or out conveyor. A longitudinal walker assembly moves the hay above the drums in a forward direction to insure an even movement of the hay to the drums. An outer conveyor moves the hay from the drums to a desired location. The out conveyor can be replaced with a spreader unit operable to spread material behind the apparatus.

In the drawings:

FIG. 3 is an enlarged sectional view taken along the line 3—3 of FIG. 1;

FIG. 4 is an enlarged sectional view taken along the line 4—4 of FIG. 2;

FIG. 5 is an enlarged sectional view taken along the line 5—5 of FIG. 2;

FIG. 6 is an enlarged sectional view taken along the line 6—6 of FIG. 3;

FIG. 7 is an enlarged sectional view taken along the line 7—7 of FIG. 3;

FIG. 9 is a fragmentary rear elevational view of the material feeding apparatus equipped with an auger out conveyor;

FIG. 10 is an enlarged sectional view taken along line 10—10 of FIG. 9;

FIG. 11 is a top plan view of the rear portion of the material feeding apparatus equipped with a material spreader unit;

FIG. 12 is a rear elevational view of FIG. 11; and

FIG. 13 is an enlarged sectional view taken along line 13—13 of FIG. 12.

Figure 1:
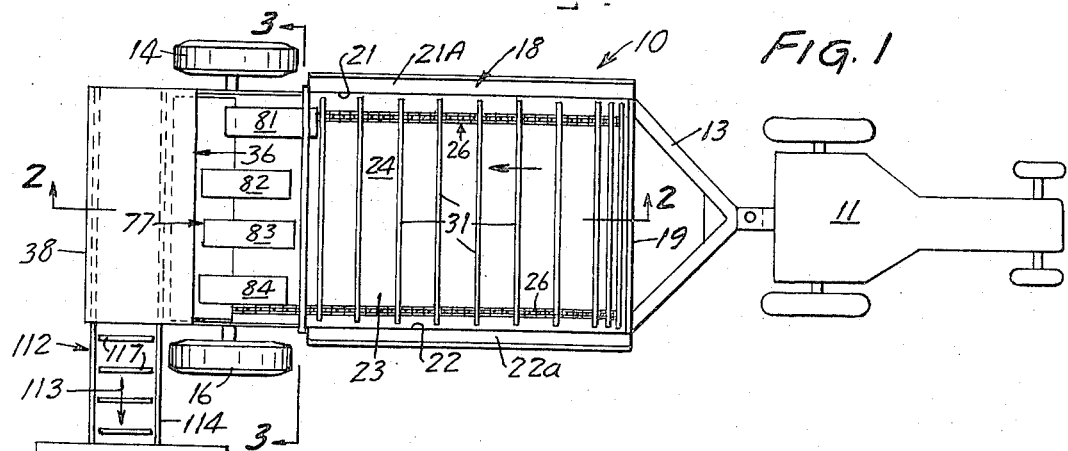
FIG. 1 is a top plan view of the material feeding apparatus connected to a tractor and located adjacent a material baling implement.

Referring to the drawings, there is shown in FIG. 1 the material feeding apparatus of self-unloading wagon of the invention indicated generally at 10 for receiving hay and delivering the hay in a steady and even stream to a hay baler indicated generally at 12. The baler 12 can be replaced with a feed grinder or other material handling equipment including but not limited to a hay chopper, bunk feeder, or conveyor. Also, apparatus 10 is usable to discharge hay into feed bunks and windrows accessible to animals or to cover crops. The apparatus can be used to blend different types of materials, as hays, and to break up rolled or baled hay. The self-unloading wagon is connected to a tractor 11 operable to provide power for operating the wagon.

Figure 2:
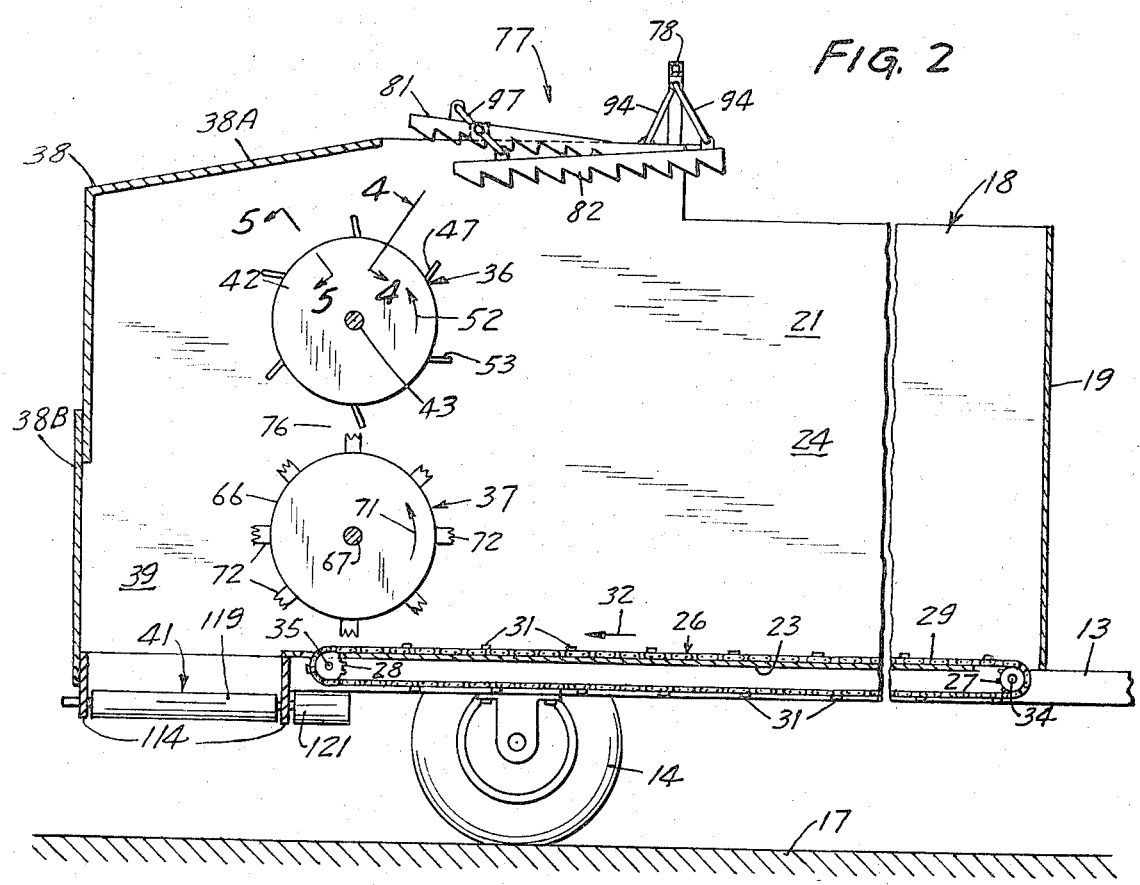
FIG. 2 is an enlarged foreshortened sectional view taken along the line 2—2 of FIG. 1.

As shown in FIGS. 1, 2 and 3, wagon 10 has a generally rectangular frame 13 secured to wheel assemblies 14 and 16. The wheel assemblies 14 and 16 support the wagon on the ground or surface 17. The forward portion of the frame forms a tongue that is releasably connected to the draw bar of the tractor 11.

An open top box indicated generally at 18 is mounted on frame 13. The box 18 has an upright transverse front wall 19 connected to rearwardly connected upright side walls 21 and 22. Side wall 21 has an upwardly and outwardly directed top flange 21A. A similar outwardly directed top flange 22A forms part of side wall 22. The bottom of the box is closed with a generally horizontal floor 23. The material receiving chamber 24 is located between the side walls 21 and 22.

An endless conveyor indicated generally at 26 extends around floor 23. Conveyor 26 has front sprockets 27 mounted on a transverse rod 34. The ends of the rod 34 are rotatably mounted in the frame 13. A rear portion of endless conveyor 26 is trained over the rear drive of sprockets 28. Sprockets 28 are mounted on the transverse shaft 35. A motor 33, as a hydraulic motor, drives the shaft 35. The conveyor 26 comprises a pair of endless chains 29 trained over the front and rear sprockets 27 and 28. A plurality of transverse slats or bars 31 are connected to the chains and move over the floor 23. Motor 33 can be a hydraulic motor or electric motor. Alternatively, the motor 33 can be replaced with a gear box driven through conventional power transmitting means operated by the power takeoff of the tractor 11.

Referring to FIG. 2 and 3, there is shown the material spreading or separating means for moving material, as hay, from the receiving chamber 24 onto an out conveyor 41. The material separating means comprises an upper transverse drum 36 located over a lower transverse drum 37. Drums 36 and 37 are located over the rear portion of the conveyor 26 and are spaced from an upright transverse rear wall 38. The top section 38A of the rear wall 28 extends upwardly and forwardly over the top of the drum 36. The bottom section 38B of wall 38 is separated from the top section 38A so that the outer conveyor 41 can be removed from the box 18. Immediately rearward of the drums 36 and 37 is a material transfer chamber 39 above out conveyor 41 to permit movement of the material to the out conveyor 41.

As shown in FIG. 3, upper drum 36 comprises a transverse cylinder 42 mounted on a transverse shaft 43. A first bearing 44 mounts shaft 43 on an upright member 45A. In a similar manner, a second bearing 46 mounts shaft 43 on an upright member 45B. Members 45A and 45B are vertically adjustable relative to side walls 21 and 22 whereby the elevation of drum 36 can be changed and the vertical space between drums 36 and 37 adjusted. Nut and bolt assemblies 79 extend through upright slots (not shown) in members 45A and 45B to provide for this vertical adjustment. A first transverse rib 47 is secured to the cylinder 42 and extends outward therefrom. Rib 47 is inclined in a forward direction and has a plurality of series of teeth 48. Shown in FIG. 4, teeth 48 have generally radial sides 49 and an upwardly inclined left side 51. Sides 49 and 51 terminate at a point 52.

Circumferentially spaced from the first rib 47 is a second transverse rib 53. Rib 53 is a continuous outwardly directed member which is inclined in the forward direction. Rib 53 has a plurality of teeth 54. As shown in FIG. 5, teeth 54 have radial sides 56 and inclined sides 57. The sides 56 and 57 terminate at a point 58. Rib 47 has teeth 48 that are inclined in a first or right direction and rib 52 has teeth 54 that are inclined in a second or left direction opposite the first transverse direction. The cylinder 42 carries four additional ribs with oppositely directed teeth as shown in FIG. 2. The number of transverse ribs with oppositely directed teeth can vary. The cylinder 42 is driven in a counter clockwise direction as indicated by arrow 52 in FIG. 2. The speed of rotation of the drum 36 is coordinated with the speed of rotation of the drum 37 through an interconnecting drive mechanism 61 comprising chain 62 and sprocket drive 63 and 64 as shown in FIG. 3. For example, the lower drum 37 can be driven 200 to 300 rpm and the upper drum 36 can be 125 to 275 rpm. Preferably, the upper drum 36 is driven about 50 to 75 rpm slower than the lower drum 37.

Lower drum 37 comprises a transverse cylinder 66 mounted on a transverse shaft 67. Bearing 68 secured to side walls 21 and 22 rotatably carries the shaft 67. The shaft 67 is driven with a motor 69, as a hydraulic motor or electric motor. Alternatively, a power transmitting means has a gear box which can be used to drive shaft 67. Shown in FIG. 2, the drum 66 is driven in a counter-clockwise direction as indicated by arrow 71. A plurality of circumferentially spaced forks or paddle members 72 are secured to the drum or cylinder 66.

Referring to FIG. 6, each fork 72 has three outwardly directed fingers 73 forming a W shaped profile with a height about twice the height of rib 53. Each finger 73 has a termination point 74. The center finger is slightly longer than the side fingers. As shown in FIG. 3, forks 72 are generally flat members projecting radially outwardly from the cylinder 66. The forks on the right half of the cylinder are inclined in an outward direction from the center. The forks on the left side of the drum are inclined in an opposite outward direction whereby the forks on acting on the material spread and comb the material as it is carried through the transverse space 76 between the drums 36 and 37.

Figure 8:
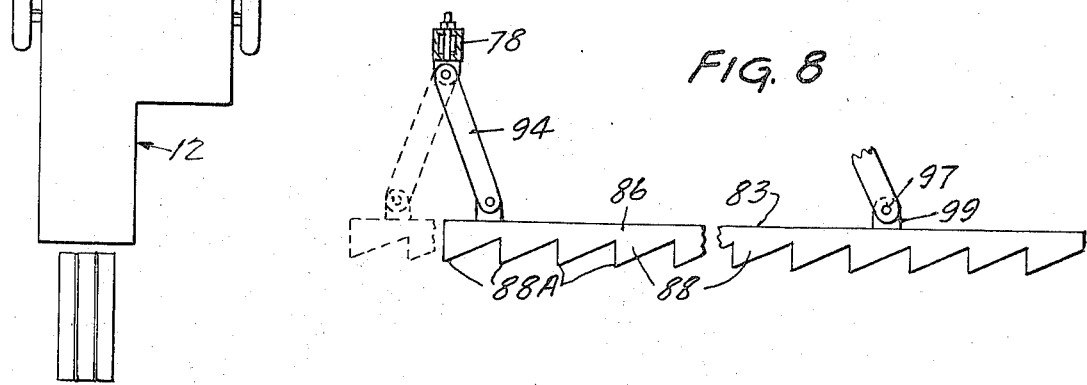
FIG. 8 is an enlarged sectional view taken along the line 8—8 of FIG. 3.

Referring to FIGS. 2 and 3, a walker apparatus indicated generally at 77 is located above and slightly forward of the upper drum 36. The walker apparatus 77 receives the material that may pile up in front of the drum 36 and moves the material to the forward portion or forward area of chamber 24. Walker apparatus 77 is movably mounted on the transverse frame 78 attached to the upper part of side walls 21 and 22 with fasteners 79. Frame 78 is joined to members 45A and 45B whereby the frame is vertically adjustable relative to side walls 21 and 22. The space between walker apparatus 77 and upper drum 36 is fixed as apparatus 77 and drum 36 move together during the vertical adjustment. Walker apparatus 77 comprises a plurality of side by side longitudinal members 81, 82, 83 and 84. Members 81–84 are identical channel shaped members having downwardly directed sides 86 and 87. As shown in FIG. 8, the sides have forwardly directed teeth 88 extending along the entire length of the side. Each tooth terminates at a point 88A. The forward end of member 81 is movably connected to the frame 78 with links 89. The upper ends of links 89 are mounted on a transverse pivot 91. A similar transverse pivot connects the lower end of the links 89 to the top of the member 81. The forward ends of members 82–84 are movably mounted on the frame 78 with similar links and pivots 93, 94 and 96, respectively, Referring to FIG. 7, the longitudinal members 83 and 84 are driven with a first crank 97 having a first arm 97A journaled in a bearing 98 secured to the top of member 84. The opposite side of crank 97 has a second arm 97B journaled in a bearing 99 secured to the top of member 82. The mid-portion of the crank is rotatably mounted on the forwardly directed stationary arm 101. The crank is driven with a drive chain 102 carried on the arm 101 and trained over a transverse shaft 103. A motor 104 secured to the shaft drives the shaft and thereby reciprocates the elongated members 83 and 84.

A second double crank 106 rotatably mounted in a third bearing 107 is secured to the member 82 and a fourth bearing 108 is secured to the member 81. The mid-portion of the crank 106 is rotatably mounted on the forward end of a fixed arm 109. The arm 109 carries a drive chain 111 trained over a sprocket secured to the shaft 103. The drive chain 111 rotates the crank 106 thereby reciprocating the elongated members 81 and 82. As shown in FIG. 3, operation of motor 104 causes the longitudinal members 81–84 to reciprocate in a longitudinal direction and move up and down. When the members 81–84 move in a forward direction, they are down; when they move in the rearward direction, they are up. This insures that the material will be moved to the front of the box away from the top drum 36.

Referring to FIGS. 2 and 3, out conveyor 41 is operable to move the material from the transfer chamber 39 to the pick-up section of the baler 12. Conveyor 41 has a laterally directed beam 114 located rearwardly of the wheel assembly 16. An endless conveyor 116 is carried by the frame 114. The endless conveyor 116 can be a belt having a plurality of upwardly directed transverse ribs or cleats 117. Alternatively, the conveyor 116 can have side chains carrying transverse ribs or slats. Conveyor 116 rolls over a plurality of rollers 118 extended between the side members of the frame 114. The end roller 119 is a drive roller connected to a motor 121. Motor 121 can be a hydraulic motor, electric motor or a gear box. Preferably, motor 121 can have varying speeds whereby the speed of the out conveyor 42 can be controlled to insure the proper feeding of the hay to the baler 12.

In use, material, as hay, straw, or the like, is initially dumped in a receiving chamber 24 through the open top of the box 18. Grabbing tongs on the lifting apparatus of a tractor can be used to move the hay from a stack into receiving chamber 24. This hay varies in density and can be tightly packed. The hay is moved with the conveyor 26 toward the grabbing and separating drums 36 and 37. As shown in FIG. 2, the drums 36 and 37 are driven in the same direction to carry the hay between the space 76 and over upper drum 36 into the transfer chamber 39. The lower drum 37 being driven faster than the upper drum 36 breaks up the larger bunches of material and delivers material upwardly to the upper drum 36 and between the drums 36 and 37. The out conveyor 41 moves the hay from transfer chamber 39 into the pickup section of the baler 12. The upper drum 36 through transverse ribs 47 and 53 having alternately directed teeth provide reciprocating transverse forces on the hay to spread the hay. This action occurs simultaneously with the spreading action of the forks 72 on the lower drum 36. The forks 72 divide the hay in opposite directions thereby breaking up the hard or dense areas and carrying the separated hay to the transfer chamber 39. The forks 72 move in contiguous relation with respect to the bottom conveyor 26. The hay is moved in an upward direction toward the walker apparatus 77. A portion of hay is moved between the drums 36 and 37. Some of the hay will move in an upward direction and engage the elongated members 81–84 of the walker apparatus 77. The reciprocating longitudinal movement of the members 81–84 will move the hay away from the upper drum 36 back to the receiving chamber 24. The walker apparatus 77 prevents the buildup of hay adjacent the upper drum 36 and has a loosening or separating effect on the hay as it moves the hay back to the receiving chamber 24.

Referring to FIGS. 9 and 10, there is shown the modified material feeding apparatus having an auger out conveyor indicated generally at 125. The out conveyor 125 replaces the out conveyor 41 and is located in the rear of the apparatus. Conveyor 125 has a generally U-shaped pan or bottom member indicated generally at 126. The forward portion 126A of the pan extends under the endless conveyor 26. A transverse sleeve 127 attached to portion 126A ia pivotally carried on a transverse rod 128. Rod 128 is secured to downwardly extended brackets 129 attached to the opposite sides of the frame of the apparatus. The sleeve 127 is rotatably mounted on rod 128 whereby the pan can move up and down to accommodate varying loads of amounts of material. The rear portion 126B of pan 126 extends in an upward direction and overlaps a portion of the end wall 38. Rear portion 126B is attached to a pair of upwardly extended springs 132. The upper ends of springs 132 are adjustably mounted on brackets 133 secured to the rear wall 38. Springs 132 permit the pan 126 to move up and down in accordance with the amount of material that is being discharged out of the conveyor 125. Springs 132 provide the out conveyor 125 with varying capacity in conjunction with substantially constant or even flow of material.

A transverse auger indicated generally at 134 extends along the lower curved portion 126C of the pan 126. As shown in FIG. 9, auger 134 extends the full length of the pan 126 so that both the auger and the pan 126 extend laterally from the side wall of the apparatus. Auger 126 comprises a core or tube 136. Preferably, the tube 136 has an 8 inch diameter and the flight 137 has a 5 inch radial extension. The flight has a 20 inch pitch. Other types and sizes of augers can be used in the out conveyor 125.

The inward end of auger 137 is mounted on the adjacent side wall with a plurality of bearings 138. Preferably, two longitudinally spaced bearings are used to support the auger 134 in a generally horizontal position. The outer end of the auger is not supported whereby the entire circumferential space around the auger is free so that the material can freely move laterally of the out conveyor 125.

The tube 136 extends through the wall 22 and carries a sprocket 139. A chain 141 trained over sprocket 139 drivably connects the auger 134 to the drive shaft for the lower drum 137. As shown in FIG. 10, chain 141 is drivably connected to the drum 37. Other types of drive mechanisms can be used to rotate the auger 134. For example, a hydraulic motor can be attached to the drum 136 to rotate the auger 134.

Referring to FIGS. 11–13, there is shown a spreader unit indicated generally at 150 mounted on the rear portion of the feeding apparatus to spread the material in an even pattern rearwardly of the apparatus 10. Apparatus 10 is identical in structure with an apparatus shown in FIGS. 1, 2 and 3 without the conveyor 41. Out conveyor 41 has been removed whereby the housing comprising the side walls 21 and 22 and rear wall 38 has an opened bottom outlet 151 so that the material discharges rearwardly of the box 18.

Spreader unit 150 has a generally horizontal U-shaped frame 152. Frame 152 has side members 152A and 152B located adjacent side walls 21 and 22 and a tranverse base or bottom 152C located across the back wall 38. The frame 152 is mounted on the angle members 153 and 154 secured to the side walls 21 and 22 respectively. The fasteners 56, as nut and bolt assemblies, are used to secure the frame to angle members 153 and 154. Fasteners 56 can be removed so that the frame 152 is readily detachable from the apparatus 10.

As shown in FIG. 12, a first gear box 157 is secured to the base part 152C of the frame. Attached to the bottom of gear box 157 is a downwardly extended tubular shield 158 surrounding a drive shaft 159. A generally horizontal disc 161 is secured to the bottom shaft 159. A plurality of outwardly directed flexible flails 162, as elongated rubber members, are attached to the top of disc 161. As shown in FIG. 13, three flails 162 are equally spaced on the disc 161. Discs 161 has three upwardly directed flanges or ribs 163. Fasteners 164 attach the flails 162 to the ribs 163.

A second gear box 166 is mounted on the base member 152C. A downwardly extended tubular shield 167 is secured to the bottom of gear box 166. Shield 167 surrounds a downwardly directed drive shaft 168. A generally horizontal disc 169 is secured to the bottom of shaft 168. The disc 169 carries a plurality of outwardly directed flexible flails 171. Flails 171 and disc 169 are identical in construction to the flails and discs shown in FIG. 13.

A common drive shaft 172 connects the gear box 157 and 166. The shaft 172 extends outwardly from gear box 157 through a bearing or support member 173. A sprocket 174 is attached to the outer end of shaft 172. A chain 176 is trained over sprocket 174 and extends in a forward direction attached to a drive sprocket on the shaft 67 of the lower drum 37. Other drive mechanisms, as a hydraulic motor, can be used to drive shaft 172.

Shaft 172 rotates to operate the gear boxes 157 and 158. The gear boxes 157 and 158 drive the shafts 159 adn 168 in opposite directions whereby the flails move in opposite directions of rotation, as indicated by the arrows in FIG. 11. This spreads the particulate material as it leaves the apparatus in a substantially uniform pattern directly behind the apparatus.

While there have been shown and described preferred embodiments of the invention, it is understood that various modifications, changes in size and substitutions of elements, materials and adjusting structures can be made by those skilled in the art without departing from the invention.

The embodiments of the invention in which an exclusive property or privilege is claimed are defined as follows:

1. A material feeding apparatus comprising: open top box means having a chamber for receiving material, rotatable means mounted on the box means for separating and moving material from the chamber, first conveyor means for moving material in the chamber toward the rotatable means, walker means located generally above said rotatable means operable to move material away from the rotatable means and into the chamber, said walker means including a plurality of longitudinally arranged members, means pivotally carrying a portion of each of said members, and crank means connected to another portion of each said members, second means receiving material from the rotatable means and discharging the material from said box means, and drive means for operating the rotatable means, first conveyor means, walker means and second means, said drive means operable to rotate said crank means whereby said members reciprocate in a longitudinal direction.

2. The apparatus of claim 1 wherein: the rotatable means includes a first transverse drum and a second transverse drum located generally above the first drum, said drive means rotating the first drum and second drum in the same direction, a plurality of outwardly directed circumferentially spaced fork members secured to the first drum, and a plurality of circumferentially spaced transverse rib means secured to said second drum.

3. The apparatus of claim 2 wherein: said outwardly directed fork means each have a plurality of outwardly directed fingers, each finger terminating in a point.

4. The apparatus of claim 2 wherein: each of said rib means has a transverse series of teeth, adjacent rib means having teeth facing in opposite directions.

5. The apparatus of claim 1 wherein: said rotatable means includes separate rotatable units having material engaging means for moving material past the rotatable means, said drive means being operable to rotate the rotatable units.

6. The apparatus of claim 1 wherein: each of said longitudinally arranged members has downwardly directed and forwardly open teeth.

7. The apparatus of claim 1 wherein: said second means is located rearward of the rotatable means and extends laterally of said box means.

8. The apparatus of claim 1 wherein: said box means includes an upwardly directed rear wall located rearward of said rotatable means, said rear wall having an upper section extended in a forward direction over said rotatable means.

9. The apparatus of claim 1 wherein: the second means includes an out conveyor having a bottom member, means pivotally mounting a part of the bottom member to the box means, biasing means holding another part of the bottom member whereby the bottom member can move up and down, auger means located above said bottom member, and drive means to rotate said auger means whereby the auger means discharges material from the box means.

10. The apparatus of claim 1 wherein: said second means comprises a spreader unit having a frame mounted on the box means, spreading means mounted on the frame, said spreading means including a downwardly directed drive shaft, flail means connected to said drive shaft, and drive means for rotating said drive shaft.

11. The apparatus of claim 10 wherein: said spreading means includes a pair of downwardly directed drive shafts, and flail means connected to lower portions of each drive shaft.

12. The apparatus of claim 10 including: shield means surrounding said drive shaft.

13. The apparatus of claim 1 wherein: the rotatable means includes a first transverse material separating means and a second transverse material separating means located above the first material separating means, means to adjust the vertical position of the first means relative to the second means, and means to rotate the first means and the second means.

14. A material feeding apparatus comprising: open top box means having a chamber for receiving material, rotatable means mounted on the box means for separating and moving material from the chamber, first conveyor means for moving material in the chamber toward the rotatable means, walker means located above said rotatable means operable to move material away from the rotatable means and into the chamber, second means receiving material from the rotatable means and discharging the material from said box means, and drive means for operating the rotatable means, first conveyor means, walker means, and second means, said second means comprising a spreader unit having a generally U-shaped frame mounted on the rear portion of the box means, a pair of gear boxes secured to said frame, downwardly directed drive shaft means secured to each gear box, flail means connected to lower portions of the downwardly directed drive shaft means, said drive means being connected to said gear boxes whereby said gear boxes rotate said drive shaft means to rotate the flail means.

15. The apparatus of claim 14 including: disc means secured to the lower ends of the drive shaft means, and means connecting the flail means to said disc means.

16. The apparatus of claim 14 including: shield means secured to the gear boxes and surrounding the drive shaft means.

17. A material handling apparatus comprising: means having a chamber for receiving material, means for separating and moving material into the chamber, means for discharging the material from the chamber, said discharging means including a bottom member, means pivotally mounting the bottom member for movement in an up and down direction, biasing means holding the bottom member and allowing the bottom member to move up and down against the force of the biasing means, auger means located above said bottom member, and drive means to rotate said auger means whereby the auger means discharges material in the direction of the auger from said bottom member.

18. The apparatus of claim 17 wherein: the means for separating and moving material into the chamber includes a first drum and a second drum located generally above the first drum, drive means for rotating the first drum and second drum.

19. The apparatus of claim 18 including: a plurality of outwardly directed spaced fork members secured to the first drum, and a plurality of circumferentially spaced transverse rib means secured to the second drum.

20. The apparatus of claim 17 including: walker means located above the means for separating and moving the material into the chamber to move material away from said means for separating and moving material into the chamber back into said chamber, said walker means including a plurality of longitudinally arranged members, and means to reciprocate said longitudinally arranged members in a longitudinal direction.

21. The apparatus of claim 20 wherein: each of said longitudinally arranged members has downwardly and forwardly open teeth.

22. The apparatus of claim 17 wherein: the means for separating and moving material into the chamber includes first transverse material separating means and a second transverse material separating means located adjacent the first material separating means, means to adjust the vertical position of the first means to the second means, and means to move the first means and the second means.

23. A material feeding apparatus comprising: first means having a chamber for receiving material, second means mounted on the first means for separating and moving material from the chamber, conveyor means for moving material in the chamber toward the second means, walker means operable to move material away from the second means and into the chamber, said walker means including a plurality of longitudinally arranged members, means movably carrying a portion of each of said members, crank means connected to another portion of each of said member, and drive means to operate the second means and crank means whereby said members reciprocate in a longitudinal direction.

24. The apparatus of claim 23 wherein: the second means includes a first transverse drum and second transverse drum, said second transverse drum being located generally above the first drum, said drive means rotating the first drum and the second drum.

25. The apparatus of claim 24 including: a plurality of outwardly directed circumferentially spaced fork members secured to the first drum, and a plurality of circumferentially spaced transverse rib means secured to the second drum.

26. The apparatus of claim 25 wherein: said outwardly directed fork means each having a plurality of outwardly directed fingers, each finger terminating in a point.

27. The apparatus of claim 25 wherein: each of said rib means has a transverse series of teeth, adjacent rib means having teeth facing in opposite directions.

28. The apparatus of claim 23 wherein: each of said longitudinally arranged members has downwardly directed and forwardly open teeth.

29. The apparatus of claim 23 including: an out conveyor for receiving the material from the second means, said out conveyor having a bottom member, means pivotally mounting a part of the bottom member to a support, biasing means holding another part of the bottom member whereby the bottom member can move up and down, other means located above said bottom member, said drive means rotating said auger means whereby the auger means move the material from the second means.

30. The apparatus of claim 23 including: a spreader unit for receiving material from the second means, said spreader unit having a frame, a downwardly directed drive shaft, flail means connected to said drive shaft, and drive means for rotating said drive shaft thereby rotating said flail means.

31. The apparatus of claim 23 wherein: the second means includes a first transverse material spreading means and a second transverse material spreading means located above the first material spreading means.

* * * * *